April 3, 1951 I. L. SUMNER 2,547,420

TELEPHONE HANDSET LOCK

Filed June 29, 1949

Inventor

I. L. Sumner

By B. M. Wilson

Attorney

Patented Apr. 3, 1951

2,547,420

UNITED STATES PATENT OFFICE 2,547,420

TELEPHONE HANDSET LOCK

Ira L. Sumner, Greenville, S. C.

Application June 29, 1949, Serial No. 102,060

1 Claim. (Cl. 179—178)

Figures 1, 2, 3, 4, 4A:
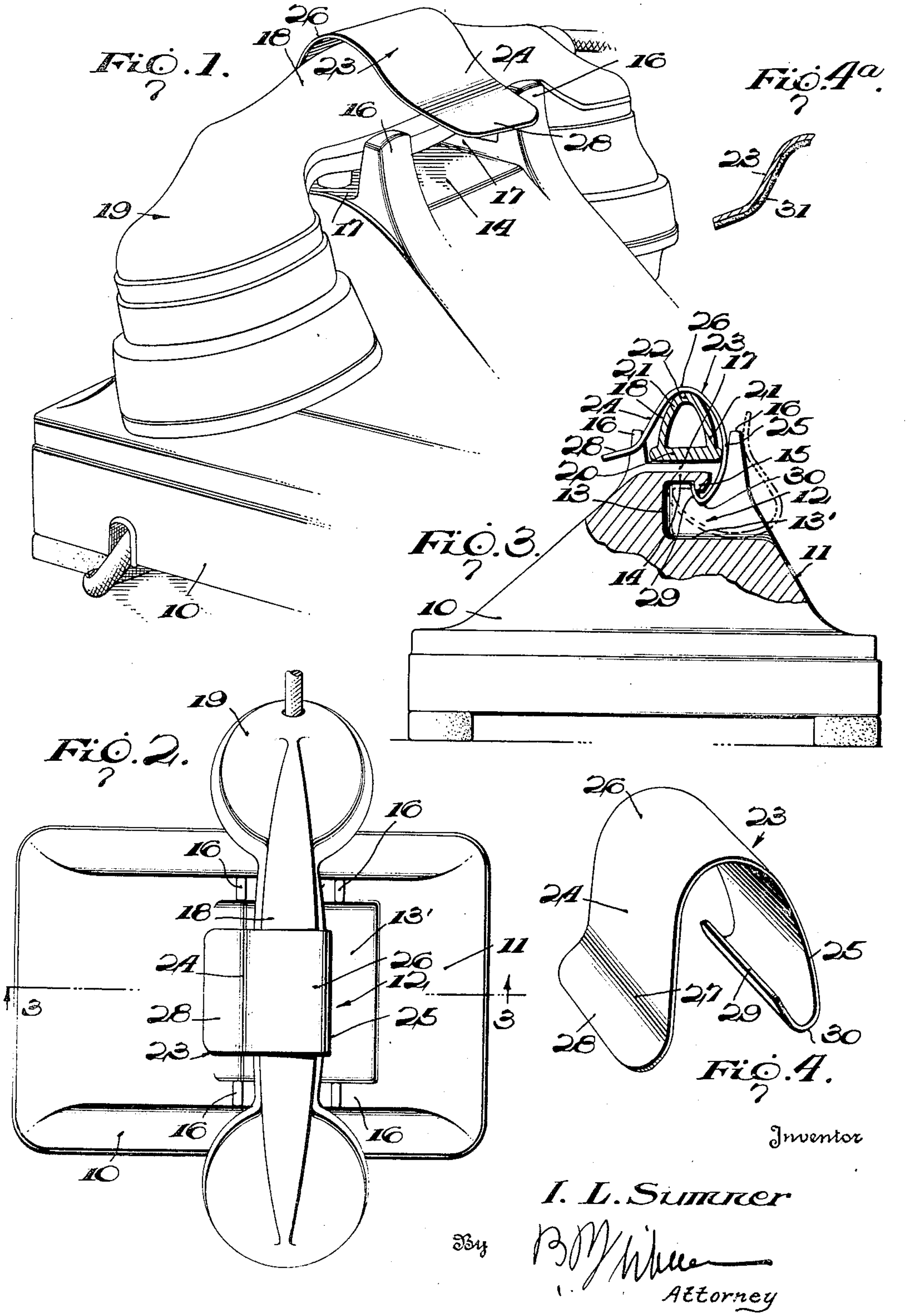

My invention relates to a telephone handset lock.

An important object of the invention is to provide a telephone handset lock which will prevent children from removing the telephone handset and leaving the same off the desk stand.

A further object of the invention is to provide a handset lock adapted for use on French-type telephones wherein the bell box forms the desk stand or pedestal of the instrument.

A further object is to provide a telephone handset lock which will effectively retain the handset in place upon the pedestal so that it cannot be accidentally removed, by jarring and the like; the lock being so designed that it can not mar or deface the telephone in any way.

A further object is to provide a device of the above mentioned class, the use of which necessitates no changes or alterations whatsoever in the telephone instrument.

A still further object of the invention is to provide a telephone handset lock which is extremely simple and inexpensive.

Other objects and advantages of the invention will be apparent during the course of the following description.

In the accompanying drawings forming a part of this application and in which like numerals are employed to designate like parts throughout the same, Figure 1 is a perspective view of a telephone handset lock shown applied to a French-type telephone, Figure 2 is a plan view of the same, Figure 3 is a central vertical section taken on line 3—3 of Figure 2, and showing the lock in an inoperative position in dotted lines, part in elevation, Figure 4 is a perspective view of the lock removed, and, Figure 4*a* is a fragmentary sectional view of a handset lock embodying a slight modification of the invention.

In the drawings, wherein for the purpose of illustration is shown a preferred embodiment of my invention, the numeral 10 designates the desk stand or pedestal of a conventional French-type telephone. This pedestal 10 includes an upwardly inclined rear side 11 having formed therein an inwardly extending recess 12 near the top of the pedestal. The recess 12 has an inner vertical end 13 and a flat horizontal bottom 13′, as shown. The pedestal has a flat horizontal top web 14, carrying an outer depending rib or flange 15, projecting into the recess 12.

At its top and opposite ends, the pedestal 10 is provided with opposed pairs of upstanding tines 16 connected at their bottom ends by transverse horizontal ribs 17, as shown. The tines 16 and ribs 17 form a cradle seat for the elongated handle portion 18 of a telephone handset 19. The handle portion 18 has a flat bottom 20 and upwardly converging curved sides 21, terminating in a rounded crown 22, Figure 3. This construction is all conventional in the type of telephone instrument illustrated by the drawing.

The telephone handset lock 23 embodying the invention preferably comprises a unitary section of relatively thin sheet metal, such as aluminum, bent into the configuration of the lock. Of course any other suitable material such as a plastic may be employed. The lock 23 comprises opposed upwardly converging sides 24 and 25, joined at their tops by a curved end 26 and forming between them a socket for receiving the handle portion 18. The side 24 is preferably substantially flat, as shown, and is bent at its lower end, generally along the horizontal line 27, for forming a flat laterally outwardly extending inclined extension or handle portion 28. The side 25 is preferably curved slightly with respect to the vertical and is bent inwardly at its lower end for forming an inner upturned flange or lip 29 joined to the side 25 by a bottom curved end 30. The lip 29 is preferably flat and inclined slightly with respect to the vertical, and arranged in opposed spaced relation to the side 25. The lock 23 is made of sheet material of the proper gauge for producing a sufficiently rigid structure to serve the desired purpose of clamping the handset 19 to the pedestal 10, and yet affording sufficient resiliency to enable the side 24 to yield slightly to and snap over the handle portion 18 of the handset.

In use, the upturned lip 29 engages below the top web 14 and is disposed inwardly of the depending lip 15, as shown. This arrangement forms a pivotal connection between the pedestal 10 and handset lock 23, the lock 23 pivoting about the upper edge of the lip 29. When it is desired to lock the handset 19 to the pedestal, so that the handset cannot be readily removed by children, or by accident, such as when the telephone is jarred, the lock 23 is swung to the position shown clearly in Figure 1, and the side 24 of the lock flexes laterally outwardly sufficiently to snap over the crown 22. In this position the side 24 and end 26 are under a slight tension, tending to positively clamp the handset 19 to the pedestal. The end 26 engages over the crown 22 of the handset, and the slightly curved side 25 generally follows the contour of the adjacent curved side 21 and lip 15. When it is desired to unlock the handset for use, the lock 23 may be swung about the top edge of the lip 29 to its open position, shown dotted in Figure 3, or removed bodily from the telephone. The handle portion 28 facilitates the manipulation of the lock 23.

When the receiver lock 23 is in the open position shown dotted in Figure 3, its handle portion 28 is directed upwardly in a substantially vertical position, and spaced laterally of one side of the receiver cradle, so that the telephone receiver may be lifted from the cradle and returned thereto without interference with the receiver lock. Once the receiver lock 23 has been swung to the open position, it tends to remain in such position due to gravity. Further, when the receiver lock 23 is in the open position, Figure 3, the flange 29 is positioned behind the rib 15 and substantially contacting the same, so that the receiver lock cannot readily move out of the recess 12 and become disconnected from the telephone pedestal 10 by jarring or the like. It is thus seen that the receiver lock or clip 23 tends to remain permanently connected with the telephone pedestal and is not apt to be jarred or knocked off of the same. When it is desired to remove the receiver lock from the telephone, the receiver 19 is removed and the receiver lock 23 is swung toward its locked position, and at the same time the lower end 30 and flange 29 are shifted downwardly and away from the depending rib 15, so that the receiver lock may be readily moved out of the recess 12.

Particular attention is directed to the fact that this telephone handset lock requires no changes or alterations whatsoever in the telephone instrument, and is designed so that the instrument will not be scratched or marred by using the lock.

To further insure against scratching the telephone instrument, it may be desirable to line the inner surface of the lock 23 with a thin layer of felt 31, or other suitable soft material, as shown in Figure 4*a*.

It is to be understood that the forms of my invention herewith shown and described are to be taken as preferred examples of the same, and that various changes in the shape, size and arrangement of parts may be resorted to, without departing from the spirit of my invention or the scope of the subjoined claim.

Having thus described my invention, I claim:

A handset lock for use upon a French type telephone comprising a desk stand having a recess formed therein, said recess having a bottom horizontal wall, an inner upstanding wall and a top horizontal wall overhanging the bottom wall, the top horizintal wall being provided near its free end with a depending rib, said depending rib being spaced from said bottom and inner upstanding walls, the outer side of the recess being open, and a handset removably mounted upon the desk stand above the recess and including a substantially horizontal handle portion, said lock comprising a resilient clip having a cross section which is generally U-shaped and including opposed first and second converging sides forming a first socket receiving the handle portion of the handset, said first side having a free end bent inwardly upon itself for forming a flange arranged in spaced opposed relation to said first side and forming therewith a second socket, said flange extending into the first socket, the second socket receiving said depending rib when the clip is in a locking position for detachably securing the handset to the desk stand, said first side being swingable vertically to a substantially horizontal position wherein it rests upon said bottom horizontal wall, said flange being then arranged substantially horizontally behind the depending rib and adapted to engage the rib to prevent separation of the clip and desk stand, said second side of the clip being then substantially vertically disposed and spaced laterally of the handle portion of the handset.

IRA L. SUMNER.

REFERENCES CITED

The following references are of record in the file of this patent:

UNITED STATES PATENTS

| Number | Name | Date |
|---|---|---|
| 1,797,091 | Kapp et al. | Mar. 17, 1931 |
| 2,003,856 | Gimbel | June 4, 1935 |
| 2,071,096 | Weber | Feb. 16, 1937 |
| 2,074,475 | Jesser | Mar. 23, 1937 |
| 2,194,772 | Sengebusch | Mar. 26, 1940 |
| 2,215,874 | Gienger | Sept. 24, 1940 |
| 2,494,449 | Obergfell | Jan. 10, 1950 |
| 2,518,554 | Kirby | Aug. 15, 1950 |